United States Patent [19]
Garner et al.

[11] Patent Number: 5,475,737
[45] Date of Patent: Dec. 12, 1995

[54] TOLL SAVER FOR CENTRALIZED MESSAGING SYSTEMS

[75] Inventors: Robert N. Garner, Turnersville, N.J.; Robert D. Farris, Sterling; Charles J. Conway, Arlington, both of Va.

[73] Assignee: Bell Atlantic Network Services, Inc., Arlington, Va.

[21] Appl. No.: 121,855

[22] Filed: Sep. 17, 1993

[51] Int. Cl.[6] .................................................. H04M 1/64
[52] U.S. Cl. .............................. 379/67; 379/82; 379/211; 379/214; 379/373
[58] Field of Search .................................. 379/67, 88, 89, 379/82, 84, 213, 214, 373, 211, 212

[56] References Cited

U.S. PATENT DOCUMENTS

| | | | |
|---|---|---|---|
| B1 3,979,560 | 5/1989 | Darwood | 379/82 |
| 3,979,560 | 9/1976 | Darwood | 379/82 |
| 4,577,063 | 3/1986 | Hanscom et al. | |
| 4,878,240 | 10/1989 | Lim et al. | 379/67 |
| 4,910,762 | 3/1990 | Brom | 379/67 |
| 4,969,186 | 11/1990 | Sayre, II | 379/376 |
| 4,975,940 | 12/1990 | Hashimoto | 379/67 |
| 5,063,589 | 11/1991 | Tsushima | 379/82 |
| 5,134,646 | 7/1992 | Carlson | 379/67 |
| 5,163,080 | 11/1992 | Amoroso et al. | 379/214 |

Primary Examiner—Jeffery A. Hofsass
Assistant Examiner—Fan Tsang
Attorney, Agent, or Firm—Lowe, Price, LeBlanc & Becker

[57] ABSTRACT

A call forwarding parameter, which a communication network uses to control forwarding of a subscriber's incoming calls to a centralized messaging system, is varied as a function of the status of a subscriber's services within the centralized messaging system. This forwarding control may apply to a variety of different types of communication network and/or to a variety of centralized messaging systems. For example, if the messaging system provides voice mail type services, and the communication network is a public switched telephone network, the voice mail system might instruct the network to change the threshold ringing interval or the threshold number of rings before forwarding unanswered calls directed to a subscriber to the voice mail system, as a function of the status of that subscriber's mailbox. In this example, if the mailbox stores new messages, the voice mail system instructs the telephone network to forward or direct calls to the voice mail system after a relatively short interval (zero to three rings). If all stored messages have been replayed to the subscriber or the subscriber's mailbox is empty, the telephone network would forward the subscriber's incoming calls to the voice mail system after a longer ringing interval or ring count (e.g. four to six rings).

45 Claims, 6 Drawing Sheets

TOLL SAVER FOR CENTRALIZED MESSAGING SYSTEMS

TECHNICAL FIELD

The present invention relates to centralized messaging systems, such as voice mail or FAX mail systems. Specifically, the present invention transfers information from a centralized messaging system to an associated office switching system of a communication network, to control operation of a call forwarding function provided through the network.

BACKGROUND OF THE INVENTION

A variety of systems are currently available for providing centralized messaging services, and the services offered are becoming increasingly popular. Such services include voice mail, store and forward type facsimile (FAX) mail, E-mail and the like. Particularly when offered by a local telephone company (TELCO) or through a TELCO's end office switch, these services involve forwarding unanswered calls directed to the subscriber's equipment to a centralized messaging system. The caller then transfers one or more messages to the centralized messaging system for storage in the called subscriber's mailbox. Subsequently, the subscriber calls in to the centralized messaging system to retrieve the messages.

Consider a voice mail service, offered by a local TELCO, as one specific example of a centralized messaging service. With a typical voice mail service offered through local telephone companies, a caller dials the subscriber's normal telephone number. If the subscriber's line identified by the dialed telephone number is busy or if there is no answer, the public switched telephone network forwards the call to a voice mail system. This voice mail system answers the call and provides an answering prompt message to the caller. In many systems, this prompt will include a personalized greeting message recorded by the called subscriber. After the prompt, the voice mail system records a message from the caller in the called subscriber's mailbox.

In many of the voice mail systems, a subscriber retrieves messages from a remote location by calling the subscriber's own telephone number. Assuming that the subscriber's line is not busy since the subscriber is away from home, the call will go unanswered. After a set ringing interval or a predetermined number of rings, the public telephone network will forward the unanswered call to the voice mail system, in the same manner as for any other call directed to the subscriber's telephone number. The voice mail system will provide the normal answering prompt to the subscriber, but the subscriber will respond by inputting some form of command code, for example by actuating one or more specific keys of a dual tone multi-frequency (DTMF) telephone. The voice mail system detects DTMF signals representing the code, executes some form of security procedure (e.g. requiring input of a personal identification code or password) and allows the subscriber access to all of the available mailbox control functions, including message retrieval. The voice mail system may provide a prompt message informing the subscriber of how many messages are stored in the subscriber's mailbox and/or how many messages are new (stored but not yet replayed to the subscriber). The subscriber can then actuate the keys on the telephone to instruct the voice mail system to replay selected stored messages, delete messages, forward messages to other voice mail subscribers, etc.

Retrieval calls of the type described above often involve a long distance telephone call from the subscriber's current location to the voice mail system and/or charges for use of a pay telephone. When there are no new messages stored in the subscriber's mailbox, the subscriber still must complete the call to the voice mail system to determine such a current empty status of the mailbox. As a result, the subscriber incurs long distance charges and/or pay telephone charges but receives no new messages. These problems also arise in calling in to check the status of mailboxes in other types of centralized messaging systems, such as FAX mail systems or E-mail systems.

A similar problem has been recognized in the answering machine art, where a subscriber calls home to retrieve messages. An advanced answering machine will wait for a relatively long ringing interval before answering (e.g. six rings) if the machine has stored no new messages since the last retrieval operation. However, if the answering machine has stored one or more new messages since the last retrieval operation, the machine waits for a shorter interval before answering (e.g. two rings). Consequently, the owner calling in to check if messages are recorded can count the number of ringback signals heard. If the owner hears three or four ringbacks, then the machine has stored no new messages, and the owner can hang up before the machine answers the call. Consequently, the owner incurs no toll or pay telephone charges for the call. If the machine has stored new messages, the machine will answer incoming calls after a short interval. If the owner is calling in, this quick answer will occur before the owner might choose to hang up, and the owner can retrieve the new messages.

A solution similar to that used in answering machines apparently has not been applied to centralized messaging systems. To do so would require the centralized answering system to identify the called subscriber prior to answering each incoming call and then vary the number of rings before answering based on the status of the called subscriber's mailbox. This would complicate operations of the centralized messaging systems. Typically, unanswered calls are forwarded to the centralized messaging system after a set number of rings at the called station. Thus, the caller has already waited for some measurable interval. To force all callers to wait an additional long number of rings before the messaging system answered the call (when no new messages are already stored in the called subscriber's mailbox), would discourage many callers. Some such callers might choose to hang up before the messaging system answered their calls, not even knowing that they could leave a message. The resultant failures to store messages for the subscriber would defeat the purpose of the centralized messaging service.

Also, many messaging systems vary the number of rings before answering in order to queue incoming calls somewhat during peak usage. If call processing resources are heavily loaded or not available, the system may allow the new incoming call to go unanswered until some resource becomes available to process the call. Systems varying the ringing period before answering for one purpose cannot effectively vary that period for another newer purpose. If the messaging system varies the ringing period to queue calls, the system can not also vary that period as an indication of mailbox status; and if the centralized messaging system were to vary the ringing period as an indication of mailbox status, that system can no longer vary that period to queue calls.

From the above discussion it should be clear that a need exists to provide some indication of the status of a subscriber's mailbox or other service provided by a centralized messaging system to a calling subscriber, before the centralized messaging system answers an incoming call.

DISCLOSURE OF THE INVENTION

The present invention addresses the above discussed need and solves the above discussed problems by providing information from the centralized messaging system to the communication network which forwards calls to the centralized messaging system. The information indicates the status of the centralized messaging system with respect to the services provided thereby to the called subscriber. In response to the information from the centralized messaging system, the communication network changes at least one parameter of the forwarding function used to route calls to the messaging system for the particular subscriber in a manner which is perceptible to subsequent callers.

In the preferred embodiments, the communication network changes the ringing period (often expressed as a threshold number of rings) before which the network forwards that subscriber's incoming calls to the centralized messaging system. Also, the status which the preferred embodiments respond to relates to whether or not the centralized messaging system has stored new messages, although monitoring of other states of the messaging system service such as the urgency of stored messages are disclosed. In one embodiment, if the information from the messaging system indicates that new messages have been stored in a subscriber's mailbox, the communication network forwards unanswered calls for that subscriber to the centralized messaging system after a relatively short interval (e.g. one to three rings). In embodiments using an advanced intelligent network architecture, the communication network actually directs the call to the centralized messaging system before ringing at the subscriber's station (i.e. after a zero interval or zero ring count). If the information from the messaging system indicates that no new messages have been stored in the subscriber's mailbox, the communication network forwards unanswered calls to the centralized messaging system after a relatively long interval (e.g. four to six rings).

Consequently, when the subscriber calls in to check if messages are recorded, the subscriber can count the number of ringback signals heard as an indication of the status of that subscriber's services in the centralized messaging system. In a mailbox system example, if the subscriber hears more ringbacks than would correspond to the normal low threshold value (e.g. more than three), then the messaging system has stored no new messages in that subscriber's mailbox. The subscriber therefore can hang up before the system answers the call and thereby avoid incurring any toll or payphone charges for the call. If new messages are stored in the subscriber's mailbox, however, the network forwards the subscriber's call to the messaging system, and that system answers relatively quickly, i.e. before the subscriber might normally choose to hang up if calling in to check status. The centralized messaging system then offers the subscriber the option to access the subscriber's services, for example to retrieve the new messages from the subscriber's mailbox in the normal manner.

The centralized messaging system may also offer the subscriber the option to call in and turn on or off the above described toll saver feature. The centralized messaging system may also offer the subscriber the further option to specify the high and low ring counts and/or the ring count used when the toll saver feature is inactive.

A first system embodying the invention provides a ring count change interface associated with the centralized messaging system. This interface communicates data between the messaging system and a multi-services platform. The multi-services platform in turn exchanges data with a switching office via a recent change-memory allocation channel. When the status of a subscriber's services in the centralized messaging system changes, the messaging system sends an instruction to the switching office via the ring count change interface, the multi-services platform and the recent change-memory allocation channel. In this embodiment, the switching office responds to the instruction by changing the ring count or interval threshold parameter used for forwarding calls for the subscriber's line when the calls go unanswered. In the mailbox example, the centralized messaging system sends an instruction to set the ring count or interval low when that system stores a new message in a subscriber's mailbox, and the centralized messaging system sends an instruction to set the ring count or interval high when that system replays all new messages from the mailbox to the subscriber.

As noted above, the present invention can be implemented using an advanced intelligent network (AIN) type communication system. In an AIN type network, local and/or toll offices of the public telephone network detect one of a number of call processing events identified as AIN "triggers". A Service Switching Point or SSP type office which detects a trigger will suspend call processing, compile a call data message and forward that message via a common channel interoffice signalling (CCIS) link to an Integrated Service Control Point (ISCP). If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link. The network offices then use the call control message to complete the particular call. The AIN system offers customers a wide variety of service features and those features can be customized to suit the needs of each customer.

In AIN embodiments, the present invention relies on normal switch based call forwarding on a no answer condition after a relatively long number of rings, when the centralized messaging system does not currently store any new messages for the called subscriber. When new messages are stored, however, a destination trigger is set in the SSP type switching system. Subsequently, when the SSP switching system receives a call to that subscriber, the SSP will suspend call processing and query the ISCP for a destination number to actually route the call to. The ISCP will return a number associated with the centralized messaging system, and the SSP type switching system will connect the call to a line to the messaging system, without a prior ring. To the caller, it appears as if the call was forwarded to the centralized messaging system before any rings (zero ring count or a zero duration ringing interval), and the messaging system will answer after a first ring or at least after a short number of rings. The calling subscriber familiar with the toll saver operation can differentiate the redirection without an initial ring from the large number of rings prior to forwarding in the same manner as in the earlier embodiment.

Two specific advanced intelligent network embodiments are disclosed. The first, utilizes the ring count change interface, the multi-services platform and the recent change-memory allocation channel to instruct the SSP to set or cancel the trigger as a function of the status of the subscriber's services in the centralized messaging system. Many centralized messaging systems instruct the switching system to set or cancel a messaging waiting indicator. In the second advanced intelligent network embodiment, the SSP type switching office sets and cancels the trigger in response to the signals from the centralized messaging system activating or canceling the message waiting indication.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

For simplicity of discussion, the description of the preferred embodiments below will assume that the centralized messaging system provides voice mail type services. The principles of the present invention, however, apply equally to other types of centralized messaging systems, such as for providing E-mail, store and forward facsimile services and the like. Also, the discussion will concentrate on changing the ring count or ring timing interval used to recognize an unanswered call for forwarding purposes as a function of whether or not a subscriber's mailbox stores any new messages. It is within the scope of the present invention to change other types of call forwarding parameters, and the present invention could vary the forwarding parameter as a function of some other aspect of status of the subscriber's service provided by the centralized messaging system, such as the level of urgency of recorded messages.

ARCHITECTURE OF FIRST EMBODIMENT

Figure 1:
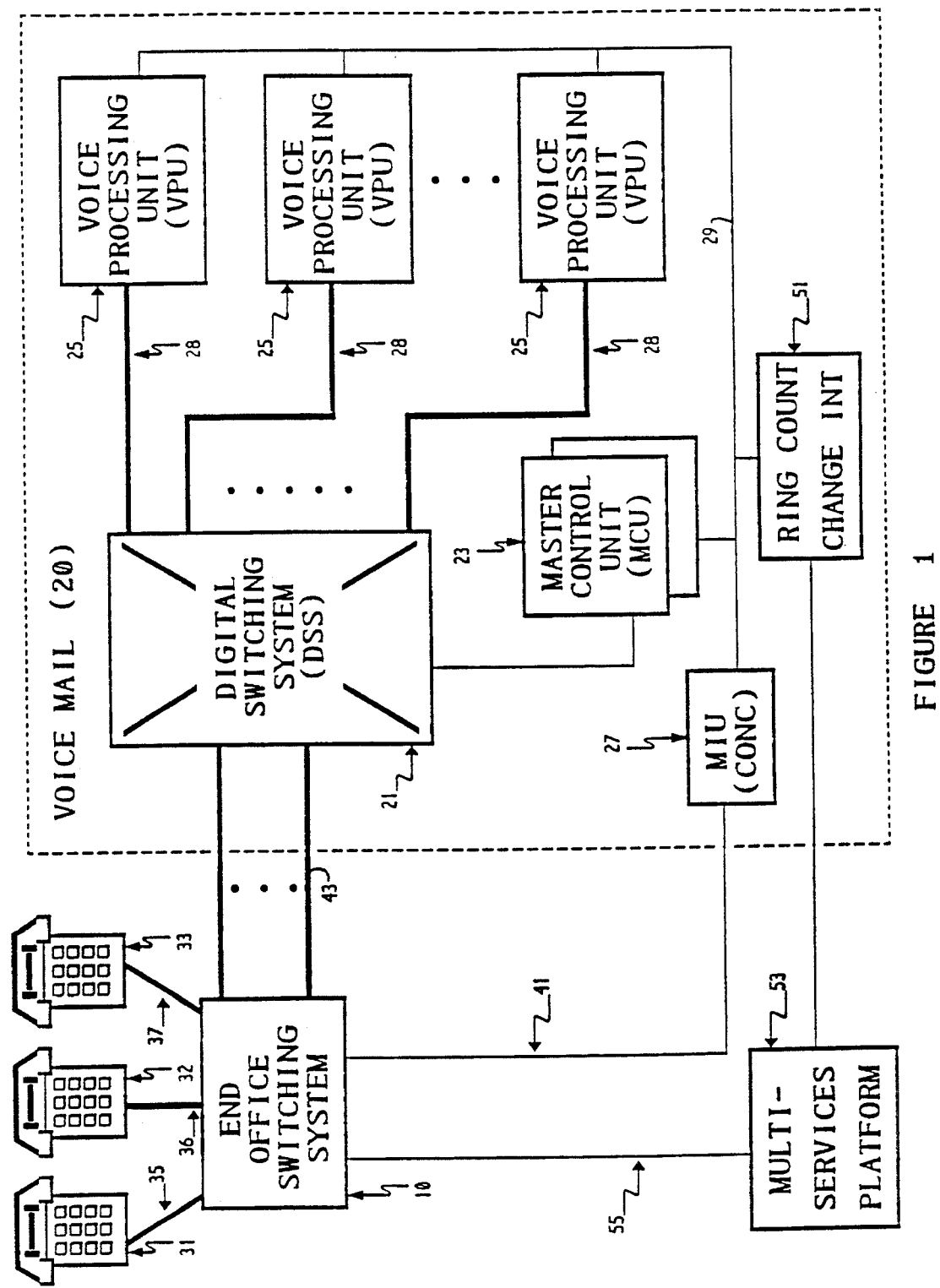
FIG. 1 is simplified block diagram of a first embodiment of a communication system implementing the present invention.

In its simplest form, shown in FIG. 1, the communication system of the present invention includes at least one switching system 10 and at least one centralized message service system 20. The switching system 10 may be a local or "end office" type telephone central office switch, such as a 1AESS or 5ESS switch sold by American Telephone and Telegraph.

The end office switching system 10 typically includes, among other components, a space or time division switching matrix, a central processing unit, an input/output device and one or more data communication units. Structurally, the switching system 10 is a standard central office telephone switch. Each subscriber has at least one piece of customer premises equipment, illustrated as telephone station sets 31 to 33 in the drawing. Local telephone lines 35 to 37 serve as communication links between each of the telephone station sets 31 to 33 and the end office switching system 10. Although shown as telephones in FIG. 1, the subscriber station equipment can comprise any communication device compatible with the line. Where the line is a standard voice grade telephone line, for example, the subscriber station equipment could include facsimile devices, modems etc.

The centralized message service system in the illustrated example comprises voice messaging equipment such as a voice mail system 20. Although referred to as "voice" messaging equipment, equipment 20 may have the capability of storing messages of a variety of different types as well as voice messages. For example, a single system 20 may receive incoming messages in the form of audible messages, such as voice messages, as well as text format data messages. The voice messaging equipment 20 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 20 includes a digital switching system (DSS) 21, a master control unit (MCU) 23, a number of voice processing units (VPU's) 25 and a master interface unit (MIU) or concentrator 27. The master control unit (MCU) 23 of the voice mail system 20 is a personal computer type device programmed to control overall operations of the system 20.

Each of the voice processing units 25 also is a personal computer type device. The voice processing units 25 each include or connect to one or more digital mass storage type memory units (not shown) in which the actual messages are stored. The mass storage units, for example, may comprise magnetic disc type memory devices. Although not specifically illustrated in the drawing, the voice processing units 25 also include appropriate circuitry to transmit and receive audio signals via T1 type digital audio lines. To adapt the system 20 to receive information other than voice and/or offer services other than voice mail, one or more of VPU's 25 might be reprogrammed to run other types of applications and/or process other types of incoming information. For example, one such unit might process facsimile information, one might process E-mail, etc.

An ETHERNET type digital network 29 carries data signals between the MCU 23 and the voice processing units 25. The Ethernet network 29 also carries stored messages, in digital data form, between the various voice processing units 25. The system 20 further includes T1 type digitized audio links 28 between the DSS switch 21 and each of the voice processing units 25.

The voice mail system 20 connects to the switching system 10 via a number of simplified message desk interface (SMDI) type data lines 41. Specifically, these SMDI links 41 connect between one or more data units (not shown) in the end office switching system 10 and the MIU 27 in system 20. Each SMDI line 41 carries 2400 baud RS232 data signals in both directions between the voice mail system 20 and the switching system 10. The MIU 27 is a data concentrator which effectively provides a single connection of as many as thirty-two SMDI lines into the MCU 23 of the voice mail system.

The voice mail system 20 also connects to the end office switching system 10 via a number of voice lines 43 which form a multi-line hunt group (MLHG) between the switch matrix within the switching system 10 and the DSS switch 21 of the voice mail system 20. Typically, the MLHG lines 43 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used.

For purposes of the present embodiment, the voice mail system 20, or other centralized messaging system, will further comprise a ring count change interface 51. The interface 51 connects to the Ethernet network 29 and provides two-way data communication between the network 29 in the voice mail system 20 and a multi-services platform (MSP) 53. For example, the unit 51 might provide a 9600 baud data channel over a line to the platform 53.

The interface 51 will receive packets of data over the Ethernet network 29 indicating changes in the status of the various subscribers' mailboxes. These packets of data will identify a particular subscriber and indicate the number a number of rings for future use in processing calls for that subscriber. The interface 51 forwards the ring count change data packets to the platform 53. The interface also receives data signals from the MSP 53, for example acknowledgements of transmitted data and/or signals indicating actual changes of status information by the switching system 10. In enhanced embodiments, the interface might include some data processing capabilities, as well. Also, the interface can provide instructions to change some other parameter of the call forwarding procedure, such as the subscriber's forwarding number.

The multi-services platform 53 connects to the end office switching system 10 via a recent change-memory administration channel (RC-MAC) 55. RC-MAC 55 is a data link to the processor of the switching system 10 for inputting data into the translation tables used by the switching system 10 to control switched communications operations with regard to each subscriber's line. The multi-services platform is a processor for receiving various service change instructions, including those from the interface 51 and from other sources, processing the instructions as necessary to make them compatible with switch programming, and forwarding instructions to the switching system 10 to change specific relevant translation table data stored in the switching system. In response to the change of status data from the ring count interface 51, the multi-services platform 53 provides appropriate data packet signals on the RC-MAC channel 55 to the end office switching system 10 to change a particular subscriber's ring count for forwarding on no answer. The instructions from the MSP 53 will identify a specific subscriber's line and will specify a ring count or ringing interval for use in determining when a call for that subscriber has gone unanswered and should be forwarded to the voice mail system 20. The multi-services platform may also forward instructions to change other parameters of the call forwarding function.

Operation via an RC-MAC channel to change data in a switching system relating to call forwarding is described in U.S. Pat. No. 5,012,511 to Hanle et al., the disclosure of which is incorporated herein in its entirety by reference. The multi-services platform 53 is the same as or substantially similar to a processor used in the patented system to process various translation memory change requests, both from RC-MAC terminals and a voice response unit.

OVERVIEW OF OPERATION OF FIRST EMBODIMENT

In various operations discussed in more detail below, calls can be forwarded to the voice mail system 20 in response to calls to subscriber's lines. The switching system 10 may also route some calls directly to the voice mail system 20 in response to callers dialing a telephone number assigned to the lines 43 going to the voice mail system 20. When the end office switching system 10 directs a call to the voice mail system 20, whether as a forwarded call or as a direct call in response to dialing of a number for accessing the system 20, the switching system places the call on any available channel on the multi-line hunt group lines 43.

When the end office switching system 10 forwards a call to the voice mail system 20, the switching system 10 will also provide various data relating to the call via one of the SMDI links 41 and the MIU 27. In particular, the switching system 10 transmits data to the MCU 23 of the voice mail system 20 indicating which line of the multi-line hunt group 43, i.e. which T1 trunk and which channel on the trunk, that the new call will come in on. The exchange 10 also transmits data via SMDI link 41 identifying the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The master control unit 23 uses the multi-line hunt group line information and the subscriber's directory number to internally route the forwarded call though DSS switch 21 and one of the internal T1 links 28 to an available voice processing unit 25 and identifies the relevant subscriber to that voice processing unit via the Ethernet 25.

For each party who subscribes to a voice mail service provided by the centralized messaging system 20, the MCU 23 stores information designating one of the voice processing units 25 as the "home" unit for that subscriber. Each voice processing unit 25 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox which each message corresponds to.

Each time a call comes in to the voice mail system 20, the master control unit 23 controls the digital switching system 21 to provide a multiplexed voice channel connection through to one of the voice processing units 25. Typically, the call connection goes to the "home" voice processing unit for the relevant subscriber. The voice mail subscriber is identified by data transmitted from the switching system 10, as described above, if the call is a forwarded call. If all 24 T1 channels to the "home" voice processing unit are engaged, the central processing unit 23 controls switch 21 to route the call to another voice processing unit 25 which is currently available.

The voice processing unit connected to the call retrieves prompt messages and/or previously stored messages from its memory and transmits them back to the calling party via the internal T1 line 28, the DSS switch 21 one of the MLHG lines 43, end office switching system 10 and the calling party's telephone line, such as line 35 or line 37. The voice processing unit 25 connected to the call receives incoming messages from the caller through a similar route and stores those messages in digital form in its associated mass storage device.

When the incoming call is a forwarded call, the connected voice processing unit 25 provides an answering prompt message to the caller, typically including a personalized message recorded by the called subscriber. After the prompt, the voice processing unit 25 records a message from the caller and identifies that stored message as one for the called subscriber's mailbox.

At times the connected voice processing unit 25 will not have all necessary outgoing messages stored within its own associated memory. For example, a forwarded call normally will be connected to the called subscriber's "home" voice processing unit 25, but if the home unit is not available the forwarded call will be connected to a voice processing unit 25 other than the subscriber's home voice processing unit. In such a case, the connected unit 25 requests and receives from the home unit 25 the personalized components of the answering prompt message via the data network 29. The connected voice processing unit 25 will store the transferred message data in its own memory, and when necessary, will play back the transferred data from its own memory as outgoing messages in the exact same manner as for any prompts or greeting messages originally stored in its own memory.

The connected voice processing unit 25 also will store any incoming message in its own associated memory together with data identifying the message as one stored for the called subscriber's mailbox. As a result, the system 20 actually may store a number of messages for any given subscriber or mailbox in several different voice processing units 25. Subsequently, when the voice mail subscriber calls in to the voice mail system 20 to access the subscriber's mailbox, the call is connected to one voice processing unit 25. Again, this call typically goes to the home unit 25 but would go to a different available one of the units 25 if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 25 sends a request the other units 25 to download any messages for the subscriber's mailbox those units have actually stored. The downloaded messages are stored in the memory of the connected voice processing unit 25 which replays them to the subscriber.

EXEMPLARY CALL PROCESSING

First Embodiment

Figure 2:
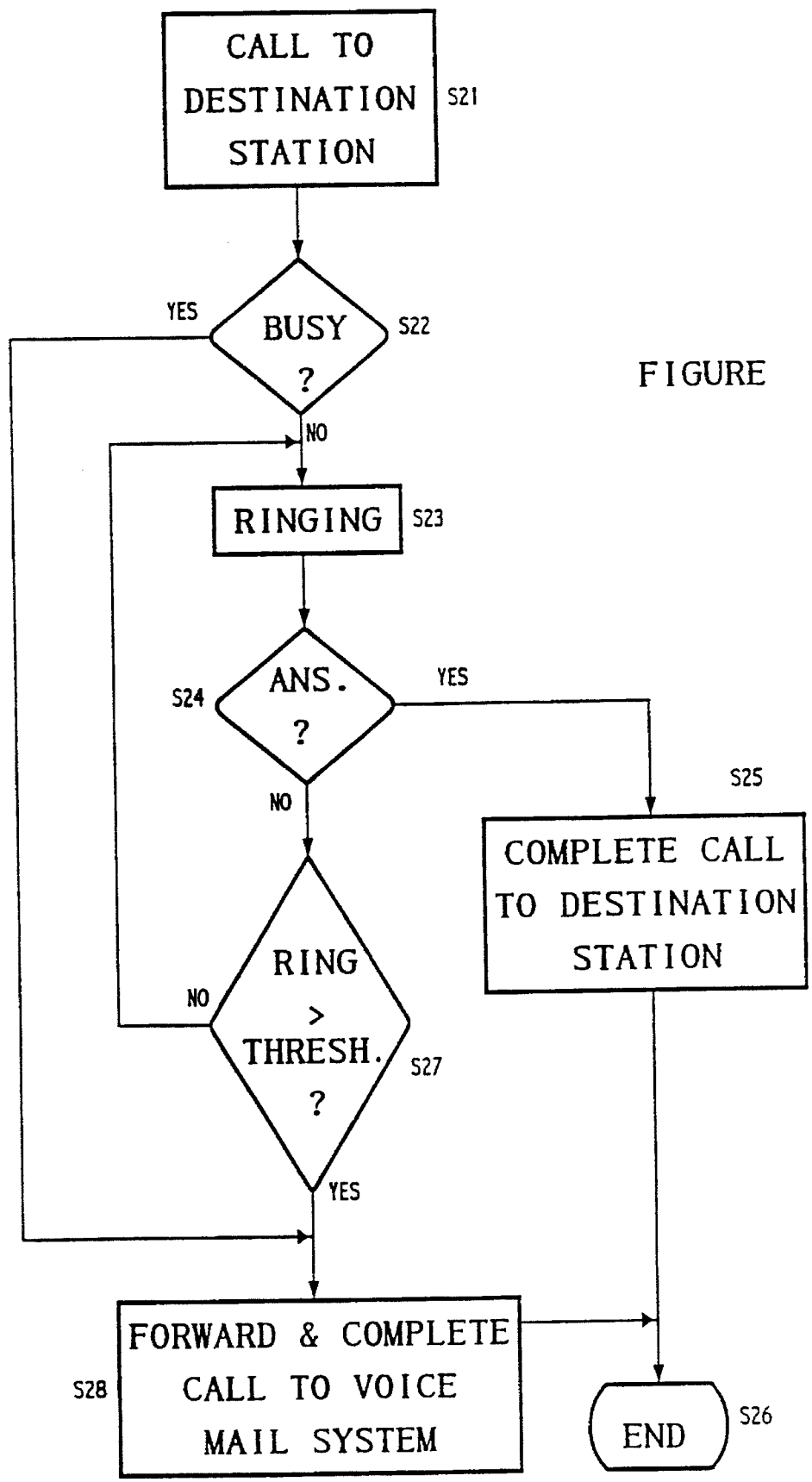
FIG. 2 is a flow chart showing the portion of the call processing in accord with the present invention performed by a switching system in the embodiment of FIG. 1.

FIG. 2 depicts in simplified form the call processing operations of the switching system 10 in accord with the first embodiment of the present invention. Processing begins when the switching system 10 receives a call directed to one of the destination stations connected to that office (step S21). The call may originate at another station connected to that same office or the call may come in through another switching system and appropriate interoffice trunk circuits (not shown in FIG. 1).

For normal telephone operation, for example when a caller at one telephone station 33 wants to call a person at another telephone station 31, the caller lifts the handset of the telephone station set off-hook and dials a directory telephone number assigned to the destination telephone line 35. The end office switching system 10 connected to the line 35 determines whether that line is busy (step S22), and if not, applies a standard two-on four-off type ringing signal to line 35 (step S23). If a person is present at the called destination, the person lifts the handset of telephone 31 off-hook, and the switching system 10 will detect an answer in step S24. The switching system provides a connection to complete the call to the destination station (step S25), and call set up processing ends (step S26).

Assume, for example, that the subscriber assigned to line 35 subscribes to the voice mail service provided by centralized messaging system 20. As part of this subscription, the central processing unit of the end office switching system 10 will store data indicating that call forwarding is active for the line 35 and an indication that forwarded calls should be routed to a number assigned to the voice mail system 20. In such a case, when the party using telephone 33 dials the directory number assigned to line 35, if the line 35 is busy or the call goes unanswered for a set period of time, the end office switching system 10 forwards the call to the voice mail system 20 via an available line of the multi-line hunt group 43 and provides the corresponding information regarding the call via SMDI link 41.

In the processing shown in FIG. 2, if the determination at step S22 indicates that the line to the called destination is busy, call processing flows to step S28. In step S28, the switching system 10 forwards the call through the multi-line hunt group 43 to the voice mail system 20, and the call is completed when the voice mail system 20 answers the call in the manner discussed above. Call set up processing by the switching system 10 ends at step S26.

If the determination at step S22 indicates that the line to the called destination is not busy, call processing flowed to step S28 where the switching system 10 applied the ringing signal to the called line 35. Now assume that the subscriber is away from home, and the call goes unanswered. The switching system 10 will check for an answer (step S24), and if not answered yet, the switching system 10 will check to see if the ringing threshold has been exceeded (step S27). The threshold value may be an actual time interval or a specified number of cycles of the ringing signal. To callers, the threshold determination sounds like a ring count, and terms such as ring count are generally used to provide a clear understanding, even though a particular switching system may measure a time interval and use a time threshold value. If the threshold has not been exceeded, call processing flows back to step S23, and ringing of the called line 35 continues. The steps S23 to S27 form a loop which will produce continued ringing of the line until answered or until the measured ringing interval or counted number of rings exceeds the particular threshold value, indicating that the call will go unanswered. Upon recognition of such an unanswered call, processing flows to step S28, where the switching system forwards the call through the multi-line hunt group 43 to the voice mail system 20, and the call is completed when the voice mail system 20 answers the call. Call set up processing by the switching system 10 ends at step S26.

In the present invention, the centralized messaging system 20 provides instructions to change various parameters of the forwarding operation of FIG. 2 such as the threshold value or the call forwarding number and/or to the activate or terminate call forwarding.

Figure 3:
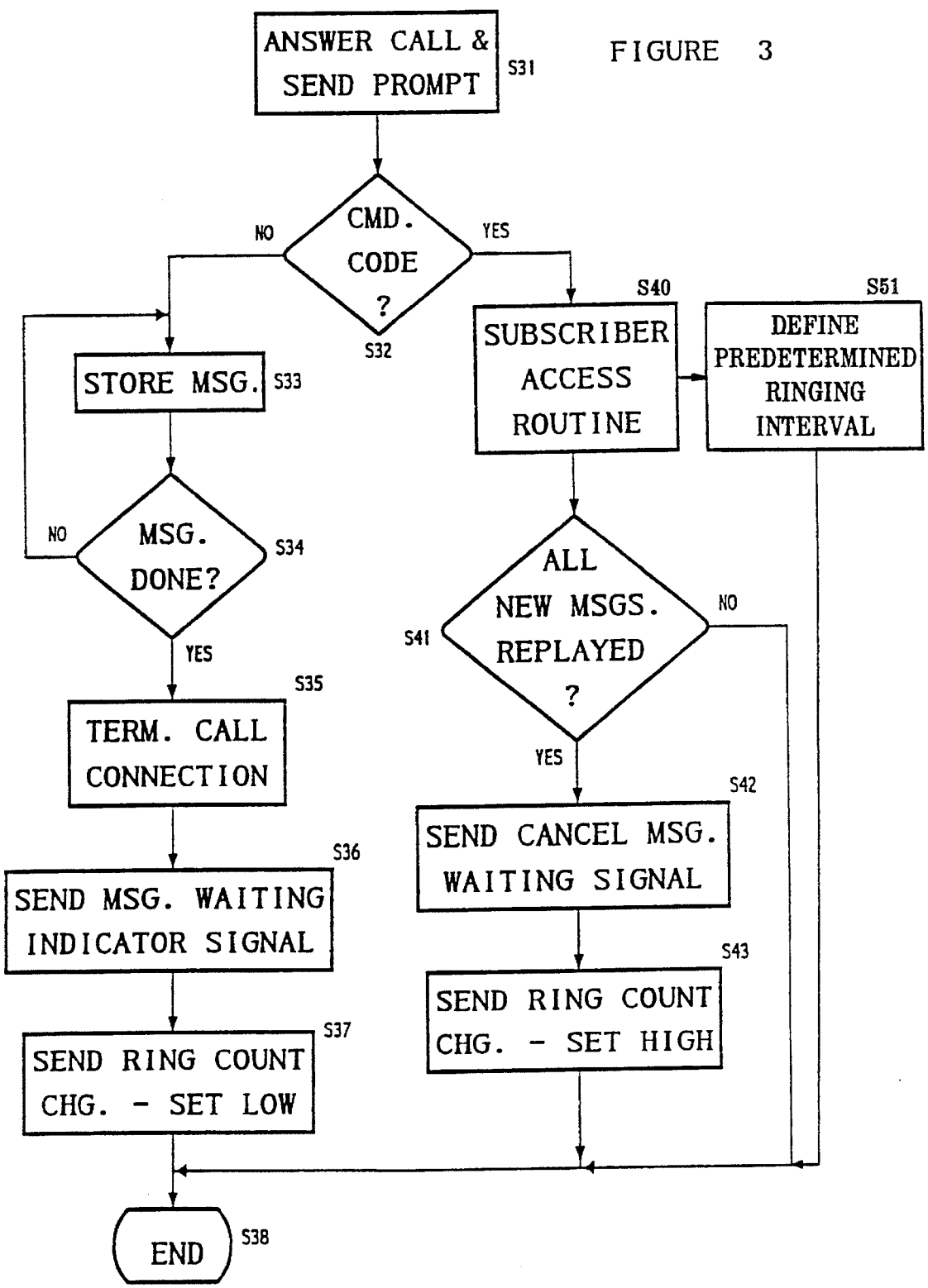
FIG. 3 is a flow chart illustrating the portion of the call processing in accord with the present invention performed by a centralized messaging system in the embodiment of FIG. 1.

FIG. 3 depicts in simplified form the call processing operations of the voice mail system 20. When the system 20 receives the call, the call would be connected to one of the VPU's 25 which would effectively answer the call and play an initial prompt message (step S31). Typically, the initial prompt would include a generic portion and a personalized portion. For example, the prompt might say "Your call has been forwarded to an automatic voice message system. (The callee) is not available. At the tone, please record your message. (beep)." In the blank, the system would insert the personalized greeting portion which would consist of the called subscriber's name previously recorded in the subscriber's own voice. The rest of the prompt is generic.

Normally, after the (beep) tone at the end of the initial prompt, the caller would begin speaking to record a message for later retrieval by the subscriber. To access the various control functions associated with a mailbox, the user may key in a specific DTMF command code, for example a "*". In the processing routine of FIG. 3, the system 20 determines whether or not the caller has keyed in the command code (step S32). Although shown after the answer and prompting step S31, the system 20 will actually look for this command code continuously throughout the procedure, e.g. during the playback of the prompt and during the period allotted for recording incoming messages.

Assuming that the caller does not input the command code, processing flows to step S33. The system 20 will continue to record the incoming message until the message is done (loop formed by steps S33 and S34). More specifically, as a message is recorded, the VPU monitors the incoming message signals. If no incoming audio is received, the VPU will play a prompt telling the caller it received no message and asking the caller to try again. If some audio is received, when the caller stops speaking for seven seconds, the voice mail system will interpret that as message completion. Also, there may be a maximum message length typically of five minutes, and the VPU will terminate message recording if the message length reaches the maximum limit.

Once recording of the incoming message is done, the system may play a prompt offering the caller a number of options after the message is recorded. For example, the caller can select to review the recorded message and/or select to record a replacement message by keying in appropriate DTMF control codes. Subsequently, the voice mail system 20 terminates the call connection (step S35).

The illustrated example assumes that each forwarded caller, other than the subscriber, leaves a message in the subscriber's mailbox. Although the processing flow is not specifically illustrated in FIG. 3, if a caller chose not to leave a message, the voice mail system 20 would skip the call processing discussed below with regards to steps S36 and S27.

Each time that the voice mail system 20 stores a new message in a particular subscriber's mailbox, the system 20 will provide a message waiting indication to the end office switching system 10 via the MIU 27 and one of the SMDI links 41 (step S36). In response to the message waiting signal, the end office switching system 10 sets an appropriate flag in its internal memory associated with that subscriber's line. If the flag is already set, e.g. due to recording of an earlier message, the switching system 10 essentially ignores the latest signal and maintains the on state of the message waiting flag. Subsequently, when someone returns to the subscriber's premises and attempts to initiate a call, the end office switching system 10 will provide a distinctive dial tone, typically an interrupted or "stutter" dial tone, to signify that the subscriber's mailbox contains a new message. The end office switching system 20 may provide a variety of other message waiting indicators, such as a short ring when a person hangs up the telephone to terminate a call at the subscriber's premises.

Each time that the voice mail system 20 stores a new message in a particular subscriber's mailbox, the system 20 also will provide a ring count change instruction to the end office switching system 10 via the interface 51, the multi-services platform (MSP) 53 and the RC-MAC link 55 in step S37, and processing ends at step S38. In the present example, the instruction sent in step S37 instructs the switching system 10 to set the particular subscriber's ring count threshold or ringing interval for forwarding on a no-answer condition to a low value. The switching system will use the low value during subsequent executions of the call processing routine of FIG. 2, specifically as the threshold in step S27. Consequently, the switching system 10 will forward unanswered calls to the voice mail system 20 after only a low ring count or short ringing interval. For later incoming calls, if the caller is the subscriber who is aware of the toll saver feature, the subscriber can recognize the forwarding after a low number of rings as an indication that the voice mail system has received and stored a new message in that subscriber's mailbox.

In the illustrated example, the low ring count instruction is sent to the switching system for every new message recorded, and the switching system 10 will simply maintain the ring count at the low value in response to each succeeding transmission of that instruction. To reduce the number of transmissions and the resultant communication load on the RC-MAC channel, the multi-services platform 53 and/or some element in the voice mail system could screen the ring count change signals, so that the low count instruction does not go to the switching system 10 if the low value has already been set, e.g. in response to an earlier new message. Within the voice mail system, this screening function could be performed by the ring count change interface (if provided with sufficient processing capabilities), by the master control unit (MCU) 23, or by the VPU's 25 receiving the messages. Similar processing capabilities in the MIU 27, the MCU 23 or the VPU's 25 could screen out repetitive transmissions of the message waiting signal over the SMDI links 41.

In the communication system of the present invention, to retrieve messages, the subscriber calls in to the subscriber's telephone number. After a set number of rings, the subscriber's call goes unanswered, and the switching system 10 forwards the call to the voice mail system 20 in the normal manner. If messages are stored, the forwarding occurs after the short interval indicated by the low number of ringing signals, as noted above. The system 20 connects the call to a VPU, as it would for any incoming call. The connected VPU plays back the normal prompt message, but the subscriber overrides the message storage function by keying in some form of command code on a DTMF telephone. In the processing routine of FIG. 3, the voice processing unit (VPU) 25 processing a particular call would detect the command code at step S32, and processing would flow to a subscriber access routine (step S40).

The subscriber access routine (S40) typically will provide a prompt requesting a password or identification code. If the caller keys in the correct password indicating the caller is the subscriber, the system allows the caller access to the various ownership control functions associated with the mailbox service. In particular, the system 20 will permit the caller to select and playback specific messages recorded in the subscriber's mailbox.

After the subscriber's access is complete, and the subscriber's call has terminated, the voice mail system 20 determines if all stored incoming messages for that subscriber have been replayed to the subscriber at least once. If not, then processing ends at step S38. If all messages have been replayed, however, call processing in the voice mail system 20 flows to step S42.

At step S42, the voice mail system 20 transmits a cancel message waiting signal to the end office switching system 10 via the MIU 27 and one of the SMDI links 41. In response to the message waiting signal, the end office switching system 10 sets the message waiting flag in its internal memory associated with that subscriber's line back to the inactive state. Consequently, the switching system 10 will no longer provide the message waiting indications on the subscriber's line.

The voice mail system 20 also will provide a ring count change instruction to the end office switching system 10 via the interface 51, the multi-services platform (MSP) 53 and the RC-MAC link 55 in step S43, and processing ends at step S38. In the present example, the instruction sent in step S43 instructs the switching system 10 to set the particular subscriber's ring count threshold or ringing interval for forwarding on a no-answer condition to a high value. The switching system will use the high value during subsequent executions of the call processing routine of FIG. 2, specifically as the threshold in step S27. Consequently, the switching system 10 will forward the next subsequent unanswered call for the subscriber to the voice mail system 20 after a larger ring count or longer ringing interval. For any such later incoming call, if the caller is the subscriber who is aware of the toll saver feature, the subscriber can recognize that forwarding has not occurred after the low number of rings as an indication that the voice mail system has not received and stored any new message in that subscriber's mailbox. If the subscriber does not need to access the system for some reason other than new message retrieval, the subscriber can hang up before the voice mail system 20 answers the call and thereby avoid incurring any pay telephone or long distance toll charges for the call.

The ring count change in the call processing embodiment of FIG. 3 changes the ring count based solely on whether the subscriber's mailbox contains a new message or the system has replayed all new messages to the subscriber. The system of the present invention, however, can change call forwarding parameters as a function of other types of status information. For example, the system might change the ring count as a function of the urgency of a stored message. When each caller calls in to leave a message, the connected VPU 25 would prompt the caller to input an indication of the urgency of the message. If the caller indicated that a message was urgent, the voice mail system 20 would send the instruction to the switching system 10 to set the ring count or ringing time interval threshold to the low value. However, the voice mail system 20 would not send such an instruction if the caller did not indicate that the new message was urgent. A subscriber calling in to check the status of her mailbox could then determine the whether or not an urgent message was stored based on the number of ringbacks heard before fowarding to the voice mail system.

The above discussed system can also change other parameters of the call forwarding function as a function of message storage or in response to other aspects of the status of the subscriber's services provided by the centralized messaging system, such as the forwarding number or the on-off status of the call forwarding function. In one example, if a subscriber's mailbox becomes full, the instruction sent to the switching system 10 might change the forwarding number. The new number might be a totally different number such as a number where the subscriber or the subscriber's secretary might be reached for purposes of live conversation. Alternatively, the new number might be a different number associated with the voice mail system, such as a general access number, but the voice mail system would respond to calls forwarded to that number with some form of a generic prompt not permitting the caller to record new messages.

Additional Features

The system of the present invention can provide the subscriber with a number of additional useful control options. At some point during the subscriber access routine (S40), the connected voice processing unit 25 would offer the subscriber a list of options, and the subscriber would select one or more options by actuating keys of a DTMF telephone.

For example, the system 20 might offer the subscriber an option to turn the toll saver feature on or off. The subscriber would select this option by actuating an appropriate key on a DTMF telephone. In response, the connected VPU 25 would initiate operations to store in the MCU 23 and/or in the subscriber's home VPU 25 an indication against that subscriber mailbox that the toll saver function is or is not active, as selected by the subscriber. A default ring count value might be used for cases where the toll saver function was inactive. If the last transmission to the switching system 10 set a ring count value other than the default value, the voice mail system would transmit an appropriate ring count change instruction to the end office switching system 10 via the interface 51, the multi-services platform (MSP) 53 and the RC-MAC link 55, to set the ring count threshold to the default value. If the default value is different from the low and high values used in the toll saver operation, when the subscriber activates toll saver, the system 20 would determine the current status of the subscriber's mailbox and provides signals to the switching system 10 to set the ring count threshold to the currently appropriate low or high value. The system might also offer to turn on the toll saver feature in relation to on other types of mailbox status, such as to provide a low ring count only in response to storage of an urgent message.

The subscriber access routine (S40 in FIG. 3) might also offer the subscriber the option to select or change other call forwarding parameters, such as the forwarding number. If the subscriber selects the option to change the call forwarding number, the voice mail system would receive a number from the subscriber and would transmit that number to the switching system for use in future forwarding operations. This would allow the subscriber to input a number for direct forwarding of calls to the subscriber's current location, temporarily bypassing the voice mail system for future calls.

As another example, the system 20 might prompt the subscriber with an option to specify the high and low ring count values to be used in the toll saver feature (S51 in FIG. 3). The subscriber would select this option by actuating an appropriate key on a DTMF telephone. The voice mail system 20 might provide one or more additional explanatory prompts each followed by DTMF keyed inputs indicating the desired number of rings for the high and low ring count threshold values. In response, the connected VPU 25 would initiate operations to store in the MCU 23 and/or in the subscriber's home VPU 25 an indication against that subscriber mailbox of the selected values. If the last transmission to the switching system 10 set a ring count value other than the value currently appropriate for the current status of the subscriber's mailbox, the voice mail system would transmit an appropriate ring count change instruction to the end office switching system 10 via the interface 51, the multi-services platform (MSP) 53 and the RC-MAC link 55. The new ring count change instruction would specify the high or low ring count threshold selected by the subscriber, depending on the current status of the subscriber's mailbox, i.e. whether or not the mailbox still contains new messages not yet replayed to the subscriber. The system might execute a similar procedure to allow the subscriber to specify the ring count or ringing interval for use when the toll saver function is inactive.

The actual ringback signals heard by callers before forwarding to the voice mail system or other centralized messaging system may vary somewhat from the ring count specified to control call forwarding. Different types of switches calculate the ringing interval before forwarding in different manners. Some switches time an interval, and some count actual ringing signals applied to the called subscriber's line. The caller hears ringback signals, not the actual ringing of the called subscriber's line. Depending on the precise counting function of the switch and/or the phase relationship of the ringback signals to the actual ringing signals applied to the called line, the caller may hear slightly more or slightly fewer ringing signals before forwarding than the number defined by the ring counts in the toll saver routines. To assist subscribers, the voice processing units 25 would explain this situation to subscriber's when they activate the toll saver feature and/or when they select specific ring count values.

Alternate Architectures (AIN)

A variety of different communication network architectures can be used in the present invention. In particular, the toll saver feature may be offered for centralized messaging systems operating through an advanced intelligent network (AIN). An AIN provides a wide variety of enhanced services to its subscribers.

Figure 4:
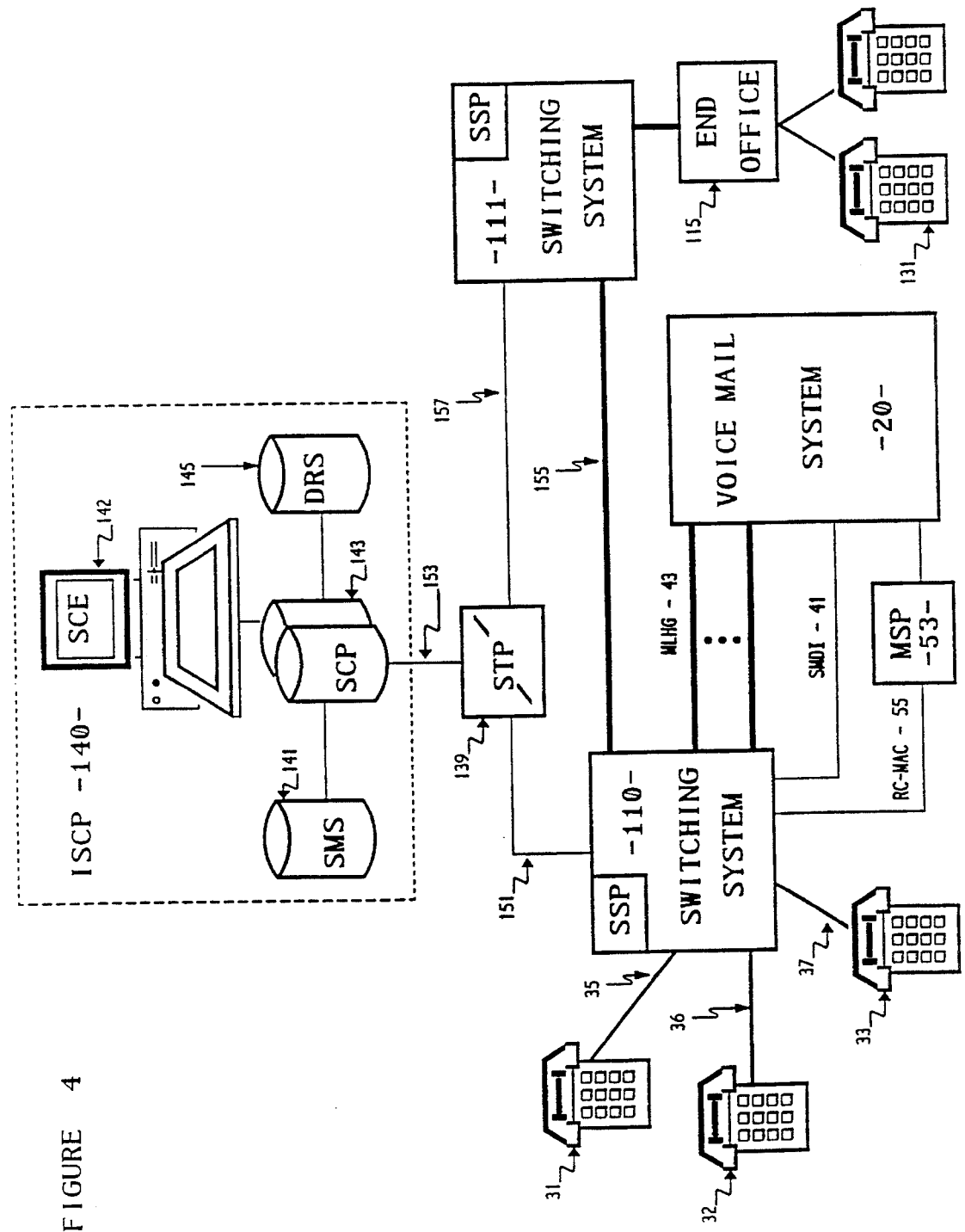
FIG. 4 is a simplified block diagram of a second embodiment of a communication system implementing the present invention, specifically one utilizing an advanced intelligent network architecture.

FIG. 4 shows one embodiment for providing centralized messaging type services, such as voice mail, with a toll saver function using an AIN. In the communication system shown in that drawing, elements corresponding to identical elements in the first embodiment (FIG. 1) are identified with identical reference numerals. For example, the voice mail system 20 in FIG. 4 is identical to that shown in FIG. 1 and connects to the switching system via the multi-line hunt group (MLHG) 43, the SMDI links 41, the multi-services platform or MSP 53 and the associated RC-MAC channel 55. The voice mail system 20 operates essentially as described above, with respect to FIG. 3.

In the embodiment of FIG. 4, the end office switching system 110 is a Service Switching Point (SSP) capable switching system. SSP's are appropriately equipped programmable switches (such as a 5ESS) present in the telephone network, which recognize AIN type calls, launch queries to the ISCP and receive commands and data from the ISCP to further process the AIN calls. The SSP functionality may reside in an end office such as shown at 110, or the SSP functionality may reside in a tandem office such as shown at 111, which in turn provides trunk connections to one or more other end offices 115 which lack SSP capability. End offices without such functionality route AIN calls to one of the SSP type offices.

The SSP's 110 and 111 connect to each other via trunk circuits for carrying large numbers of voice communications, such as the trunk circuit shown as thick dark line 155 in FIG. 4. The SSP's 110 and 111 also connect to an STP 139 via data links 151, 157, for signalling purposes. An STP can connect to a large number of the SSP's. The STP 139 provides data signalling communications between the SSP's 110, 111 and with the ISCP 140. Although shown as a single STP, the AIN may include a number of STP's organized in an appropriate hierarchy to handle the expected level of signalling traffic. The data links 151, 157 between the SSP type switching systems 110, 111 and the STP 139 are typically SS7 (Signalling System 7) type CCIS interoffice data communication channels. The STP 139 in turn connects to other STP's and to the ISCP via a packet switched network 153 which may also be an SS7 network. The above described data signalling network between the SSP type offices and the ISCP is preferred, but other signalling networks could be used.

The messages transmitted between the SSP's 110, 111 and the ISCP 140 are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from an SSP includes among other data a "Service Key" which is the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per state, to avoid overloading existing CCIS data links. Alternatively, the ISCP could be implemented on a LATA by LATA basis or on a regional operating company basis, i.e. one data base for the entire geographic area serviced by one of the Regional Bell Operating Companies. In fact, if federal regulations permitted, the data base service could become nationwide.

The ISCP 140 is an integrated system. Among other system components, the ISCP 140 includes a Service Management System (SMS) 141, a Data and Reporting System (DRS) 145 and the actual database referred to as a Service Control Point (SCP) 143. The ISCP 140 also typically includes a terminal subsystem referred to as a Service Creation Environment or SCE 142, for programming the data base in the SCP 143 for the services subscribed to by each individual subscriber to one of the AIN services. The SMS 141 validates service logic and data entered by the TELCO or the subscriber, and manages the process of actually updating the data files in the SCP database 143.

Each central office switching system or SSP normally responds to a service request on a local communication line connected thereto, for example an off-hook followed by dialed digit information, to selectively connect the requesting line to another selected local communication line. The connection may be made locally through only the connected central office switching system. For example, for a call from station 31 to station 32 the end office type SSP 110 provides the call connection without any connection to another central office. When the called line connects to a distant station, for example for a call from station 31 to station 131, the connection is made through the connected end office switching system SSP 110 and at least one other central office switching system, such as tandem SSP 111 and end office 115, by means of the telephone trunks interconnecting the various office switching systems.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's originally was developed to alleviate this problem.

In the CCIS type call processing method, the local central office suspends the call and sends a query message through one or more of STP's. The query message goes to the central office to which the called station is connected, referred to as the "terminating" central office. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations. In an AIN type network system, these normal call processing routines would still be executed for completion of calls between customer stations, when call processing does not involve one of the AIN services.

In an Advanced Intelligent Network (AIN) type system, such as shown in FIG. 4, certain calls receive specialized AIN type processing under control of data files stored in the SCP database 143 within the ISCP 140. In such a network, the SSP type offices 110, 111 of the public telephone network detect a call processing event identified as an AIN "trigger". For ordinary telephone service calls, there would be no event to trigger AIN processing; and the local and toll office switches would function normally and process such calls as discussed above, without referring to the SCP database 143 for instructions. An SSP type switching office which detects a trigger, however, will suspend call processing, compile a TCAP formatted call data message or "query" and forward that message via a common channel interoffice signalling (CCIS) link 151 or 157, the STP 139, and link 153 to the ISCP 140 which includes the SCP database 143.

The TCAP query message contains a substantial amount of information, including for example data identifying the off-hook line, the number dialed and the current time. Depending on the particular AIN service, the ISCP uses a piece of data from the query message to identify a subscriber and access the subscriber's files. For example, for some form of terminating type AIN service the dialed number would correspond to the called AIN subscriber, therefore the ISCP 140 uses the dialed number to access the subscriber's data file within the SCP database 143. From the accessed data, the ISCP 140 determines what action to take next. If needed, the ISCP 140 can instruct the central office to obtain and forward additional information, e.g. by playing an announcement and collecting dialed digits.

Once sufficient information about the call has reached the ISCP 140, the ISCP accesses its stored data tables to translate the received message data into a call control message. The call control message may include a substantial variety of information including, for example a destination number and trunk group selection information. The ISCP 140 returns the call control message to the particular SSP 110 or 111 which initiated the query via CCIS links and the STP 139. The SSP then uses the call control message to complete the particular call through the network.

The SSP type switches can recognize a variety of events as triggers for activating a query and response type AIN interaction with the ISCP, and different AIN services use different types of triggers. The present invention involves a call forwarding or call redirect type AIN service and uses a dialed destination number as the triggering event. This type of trigger is sometimes referred to as a terminating trigger. Other types of AIN type services using the dialed number of the terminating station or subscriber as the trigger are disclosed in commonly assigned U.S. patent application Ser. No. 07/845,924 filed Mar. 5, 1992, entitled Personal Communication Services Using Wireless/Wireline Integration, and U.S. patent application Ser. No. 07/888,098 filed May 26, 1992, entitled Method for Concurrently Establishing Switch Redirection for Multiple Lines, the disclosures of these two commonly assigned applications being incorporated herein in their entirety by reference.

In the AIN embodiments of the present invention, the voice mail system 20 operates exactly as in the first embodiment (see FIG. 3). The SSP type switching system 110 provides a forward on 'no answer' condition of the type used in the first embodiment, and this call forwarding operation corresponds to the operation shown in FIG. 2. The difference is that the switching system 110 will use the forwarding operation of FIG. 2 only for the high count forwarding when no new message is stored. In such cases, the switching system 110 will use only one relatively high ring count threshold for all calls to any given voice mail subscriber's line. This threshold value may be a high default value, or the high threshold value may be one selected by the subscriber during the subscriber access routine (S40, FIG. 3) discussed above. The SSP type switching system 110 will execute this forwarding routine with a high threshold for calls to a subscriber after a signal from the voice mail system indicating that all new messages for that subscriber have been replayed, i.e. after receipt of a signal equivalent to the ring count change to high instruction sent in step S43 of FIG. 3.

In switch based call forwarding of the type discussed above, if a called subscriber's line is available, the switching system terminates calls for a subscriber on the subscriber's line. The switching system forwards the call to the forwarding number, e.g. a number associated with the multi-line hunt group 43 into the voice mail system, only if no one answers the call for a certain ringing interval or a certain ring count. In an AIN, such as shown in FIG. 4, the network can reroute a call without first terminating the call on the called line. The AIN actually redirects the call to the destination during initial call processing, without waiting for a no-answer condition. The illustrated AIN embodiments of the present invention rely on such AIN type call redirection to route calls for subscriber's who have messages waiting directly to the voice mail system 20.

To initiate AIN type call redirection, the switching system sets a destination number trigger in its internal translation information associated with a particular subscriber's line. The trigger is set in response to a signal from the voice mail system 20 indicating that the system 20 has stored new messages for that subscriber, i.e. in response to a signal equivalent to the ring count change to low instruction sent in step S37 of FIG. 3.

While the trigger associated with a subscriber's line is active, when the SSP switching system 110 receives a call to that subscriber, the SSP will suspend call processing and query the ISCP 120 for a destination number to actually route the call to. The ISCP 140 will return a number associated with the multi-line hunt group 43, and the SSP type switching system 110 will connect the call to one of the lines of that group 43. To the caller, the first ringback heard will correspond to the first ring at the voice mail system. This results in a forwarding to the voice mail system without a prior ring.

In the system of FIG. 4, the voice mail system 20 will still send some form of signal to the switching system 110 through the interface 51, the MSP 53 and the RC-MAC channel 55 equivalent to the ring count change to high instruction sent in step S43 of FIG. 3. In response, the switching system 110 will cancel the terminating trigger designation associated with the particular subscriber's line. The next call to the subscriber will therefore be forwarded by the switch after a high number of rings without an answer on the subscriber's line.

The calling subscriber familiar with the toll saver operation can differentiate the redirection without an initial ring from the large number of rings prior to forwarding in the same manner as in the first embodiment.

Figure 5:
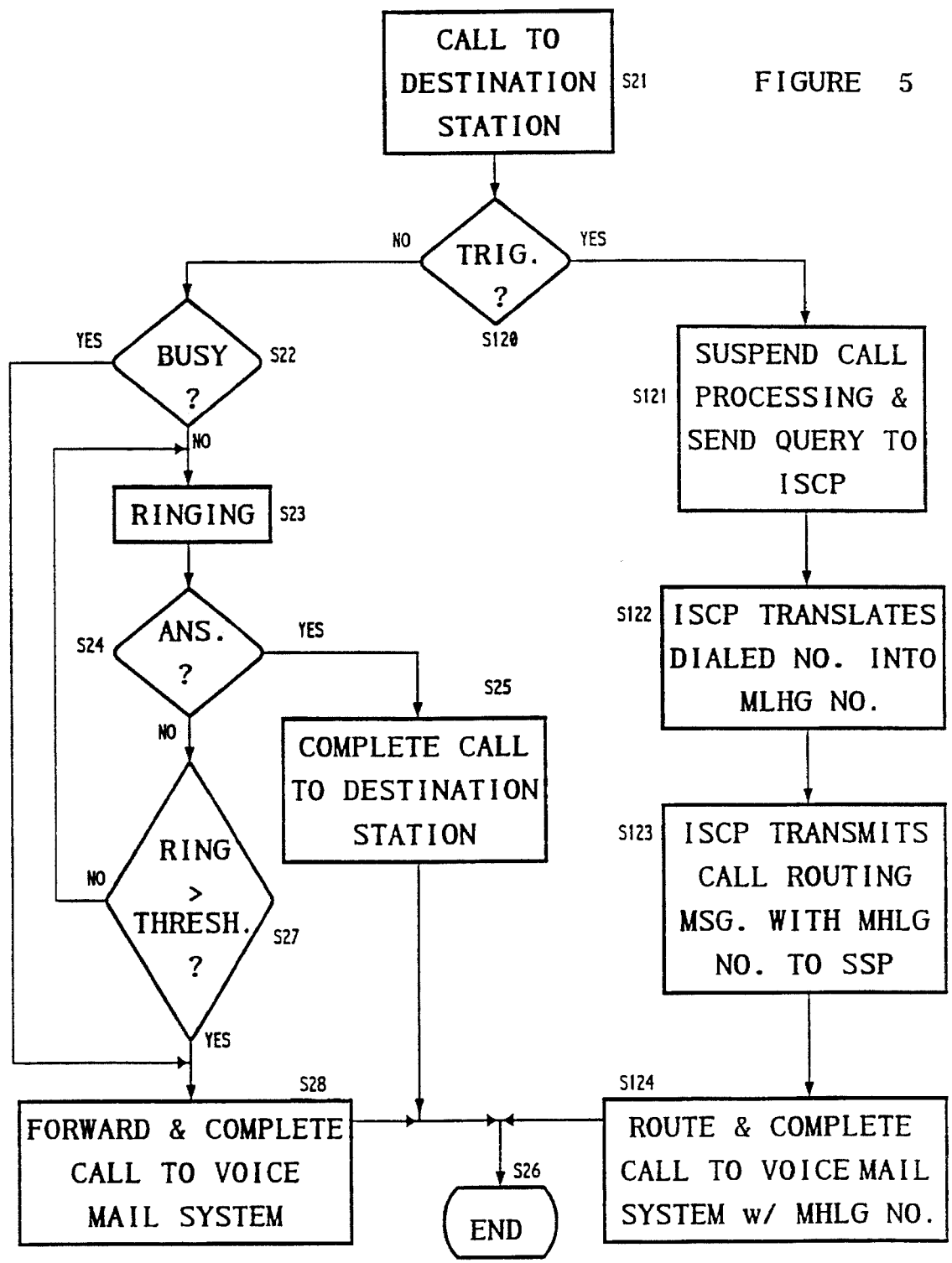
FIG. 5 is a flow chart showing call processing of the type used in an advanced intelligent network embodiment, such as that shown in FIG. 4, to route calls to a centralized messaging system.

FIG. 5 shows in simplified form the call processing discussed above to route calls to the voice mail system 20 in the embodiment of FIG. 4. As in the earlier embodiment, processing begins when the switching system 110 receives a call to one of the destination stations connected to that office (step S21). However, at step 120, the system 110 branches based on whether or not a destination trigger has been set for the called subscriber's line. If there is no trigger set, the switching system 110 executes steps S22 to S28 to complete the call to the subscriber's station or forward the call to the voice mail system 20, exactly as in the embodiment of FIG. 2 discussed in detail above. The ring count threshold determination (step S27) uses a relatively high ring count for the threshold value. If the destination trigger has been set for the called subscriber's line, then at step S120 the switching system 110 executes steps S121 to S124 to route the call using AIN procedures to redirect the call to the voice mail system before any initial ringing.

More specifically, in step S121, the SSP 110 suspends call processing and sends a query to the ISCP 120 (step S121).

The ISCP 140 accesses data in SCP database 143 to translate the dialed destination number into an actual destination number (step S122), in this case a number associated with the multi-line hunt group (MLHG) 43. The ISCP 140 complies a return result message including the MLHG number and transmits that message back to the SSP type switching system 110 (step 123). The SSP uses the routing data in the return result message, including the MLHG number to connect the call to one of the lines of that group 43. Thus the call is routed to and completed at the voice mail processing system 20 (step 124), and call set up processing ends at step S26.

Figure 6:
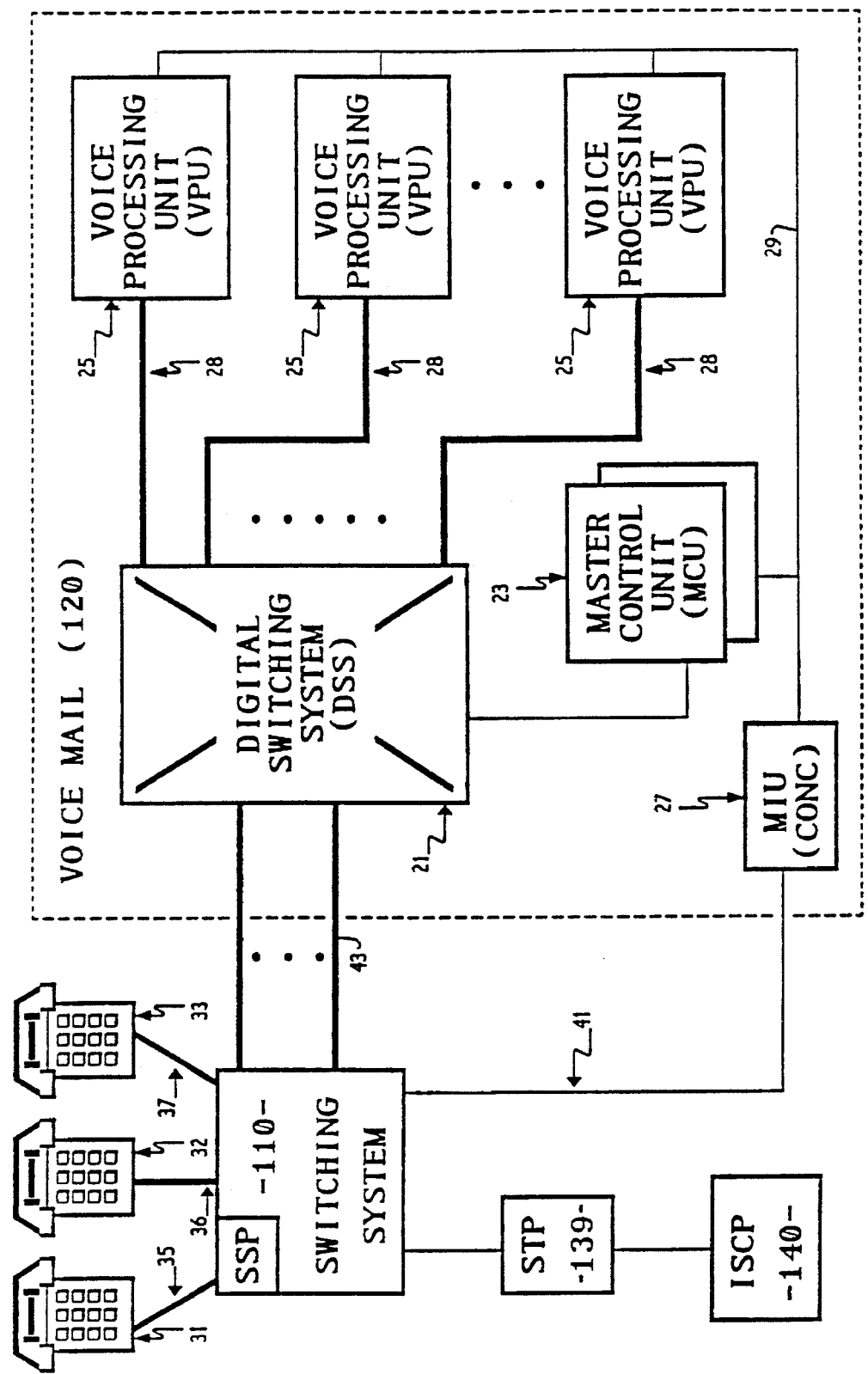
FIG. 6 is a simplified block diagram of another embodiment of a communication system implementing the present invention using an advanced intelligent network architecture.

The system of FIG. 6 is essentially similar to that of FIG. 4, but for simplicity only one switching system is illustrated. The voice mail system 120 in this embodiment is similar to the system 20 in the earlier embodiments, and like components have been indicated by like reference numerals. The voice mail system 120, however, does not include the ring count interface for providing data communications to the multi-services platform (MSP). In this embodiment, the SSP type switching system 110 is programmed to set or turn off the trigger for AIN processing associated with each subscriber's line in response to the message waiting and cancel message waiting signals transmitted from the MIU 27 via one of the SMDI links 41.

The AIN implementations of the present invention may be further enhanced by transferring more control of the call forwarding functions from the switching offices to the ISCP. For example, the switching offices might be programmed to trigger AIN call processing in response to all calls to the messaging service subscribers' numbers. The SCP data base 143 would store all relevant call forwarding parameter data, and the ISCP would return appropriate information to an SSP type office to facilitate actual forwarding or redirection of each call. The switching system would transmit all of the change instructions from the centralized messaging system up to the ISCP 140 for validation and updating of the relevant subscribers' data files in the SCP data base 143.

Although several preferred embodiments of the invention have been described in detail above, it should be clear that the present invention is capable of numerous modifications as would be apparent to one of ordinary skill in the art. Such modifications fall within the purview of the appended claims.

We claim:

1. In a switched communications network having at least one switching system for providing selective communications between subscribers' lines, said at least one switching system also providing selective communications between subscribers' lines and a centralized messaging system for storing messages directed to individual subscribers, a method comprising:

forwarding to the centralized messaging system a first call directed to one subscriber's line if the first call is not answered within a first interval;

recording a message for a called subscriber in the centralized messaging system;

sending an instruction from the centralized messaging system to the communication network in response to the recording of a message for the called subscriber;

in response to the instruction, forwarding a second call directed to the one subscriber's line to the centralized messaging system after a second interval, shorter than the first interval.

2. A method as in claim 1, wherein the first interval is defined by a first number of rings of the one subscriber's line, and the second interval is defined by a second number of rings of the one subscriber's line, the first number of rings exceeding the second number of rings.

3. A method as in claim 2, wherein the step of forwarding a first call comprises:
   routing the first call to the one subscriber's line;
   applying a periodic ringing signal to the one subscriber's line, and rerouting the first call from the one subscriber's line to the centralized messaging system if the first call is not answered after a number of periods of the ringing signal equal to said first number of rings.

4. A method as in claim 3, wherein the step of forwarding a second call comprises:
   routing the second call to the one subscriber's line;
   applying the periodic ringing signal to the one subscriber's line, and
   rerouting the second call from the one subscriber's line to the centralized messaging system if the second call is not answered after a number of periods of the ringing signal equal to said second number of rings.

5. A method as in claim 3, wherein the step of forwarding a second call comprises routing the second call directly to the centralized messaging system such that the second number of rings is zero.

6. A method as in claim 1, further comprising storing in translation data associated with the one subscriber's line in the at least one switching system information specifying the second interval in response to the instruction.

7. A method as in claim 1, further comprising the steps of:
   answering the second call at the centralized messaging system;
   transmitting the recorded message via the answered second call;
   sending another instruction from the centralized messaging system to the communication network;
   in response to said another instruction, forwarding a third call directed to said one subscriber's line to the centralized messaging system after said first interval.

8. A method as in claim 7, further comprising:
   in response to the instruction after recording of the message, storing in translation data associated with the one subscriber's line in the at least one switching system information specifying the second interval; and
   in response to said another instruction, replacing the stored information specifying the second interval in the translation data associated with the one subscriber's line in the at least one switching system with information specifying the first interval.

9. A method as in claim 7, further comprising:
   in response to the instruction after recording of the message, setting a destination trigger in translation data associated with the one subscriber's line in the at least one switching system to instruct the at least one switching system to access a remote database in response to the second call; and
   in response to said another instruction, removing the destination trigger associated with the one subscriber's line in the at least one switching system.

10. A method as in claim 1, wherein the communication network is a public switched telephone network, and the subscribers' lines are telephone lines.

11. A method as in claim 1, wherein the stored message is a voice message.

12. A method as in claim 1, further comprising receiving input information from a subscriber defining the first interval and the second interval.

13. A method as in claim 1, further comprising receiving input information from a subscriber activating or deactivating changes in call forwarding operations for subsequent calls.

14. In a switched communications network for providing selective call connections between subscribers' lines and between subscribers' lines and a centralized messaging system, a method comprising:
   routing a call directed to one subscriber's line through the switched communication network to the centralized messaging system after a specified period;
   wherein the specified period will have either a first value or a second value depending on whether or not the centralized messaging system has previously stored at least one new message for the one subscriber, said first value being higher than said second value.

15. A method as in claim 14, wherein said first value corresponds to application of a first number of ringing signals to the one subscriber's line, and said second value corresponds to application of a second number of ringing signals to the one subscriber's line, the first number being higher than the second number.

16. A method as in claim 15, wherein the second number is zero.

17. In a switched communications network having at least one switching system for providing selective call connections between subscribers' lines, and a centralized messaging system for storing messages directed to individual subscribers, said at least one switching system also providing selective connections between the subscribers' lines and the centralized messaging system, a method comprising:
   routing a plurality of calls, which are directed to one subscriber's line and which are not answered after a threshold period, through the communication network to the centralized messaging system;
   setting said threshold period to a first predetermined value for a first one of said calls and setting said threshold period to a second predetermined value lower than said first predetermined value for a second one of said calls as a function of the status of a mailbox maintained for said one subscriber in said centralized messaging system.

18. A method as in claim 17, wherein said status relates to whether or not the centralized messaging system stores any messages for said one subscriber.

19. A communications system comprising:
   a switched communications network for providing selective call connections between subscribers' lines;
   a centralized messaging system for storing messages directed to individual subscribers and transmitting stored messages to subscribers, wherein the network forwards calls directed to one of said subscribers' lines to said centralized messaging system; and
   means for sending an instruction to the network indicating that the centralized messaging system has stored at least one message for the one subscriber,
   wherein said network changes a parameter of its call forwarding function with respect to calls directed to the one subscriber's line in response to said instruction, the change in the parameter of the call forwarding function being perceptible to subsequent callers.

20. A system as in claim 19, wherein:
   said means for sending an instruction to the network sends another instruction to the network after the centralized messaging system has transmitted all stored messages for the one subscriber to the one subscriber, and the network changes the parameter of its call forwarding function with respect to calls directed to the one subscriber in response to said another instruction.

21. A system as in claim 19, wherein the network comprises a switching system, and said means for sending an instruction to the network comprises:

a ring count change interface associated with the centralized messaging system for transmitting the instruction;

a multi-services platform connected to receive and process the instruction from the ring-count interface; and a recent change-memory allocation channel through which the multi-services platform transmits the processed instruction to the switching system.

22. A system as in claim 19, wherein said means for sending an instruction to the network transmits said instruction to a switching system of the network via a simplified message desk interface (SMDI) link.

23. A system as in claim 19, wherein said means for sending an instruction to the network sends a message waiting signal to the network in response to which the network will also provide a message waiting indication to the one subscriber via the one subscriber's line.

24. A system as in claim 23, wherein said means for sending an instruction to the network transmits said message waiting signal to a switching system of the network via a simplified message desk interface (SMDI) link.

25. A system as in claim 19, wherein said centralized messaging system is a voice mail system.

26. A system as in claim 25, wherein said voice mail system comprises:

a plurality of voice processing units for transmitting prompting messages to callers and receiving and storing messages from callers; and means for selectively routing a plurality of calls forwarded by the network to individual ones of the voice processing units.

27. A system as in claim 19, wherein the network comprises a switching office of a public switched telephone network.

28. A system as in claim 19, wherein the network comprises:

a first switching system and a second switching system for providing the selective call connections between subscribers' lines; and a central control separate from the first and second switching systems, said central control sending data to and receiving data from the first and second switching systems to control said first and second switching systems; wherein if the centralized messaging system has stored no un-replayed message for the one subscriber, the first switching system routes calls to the one subscriber's line and forwards calls to the centralized messaging system if the calls are unanswered after a predetermined interval, and if the centralized messaging system has stored at least one un-replayed message for an identified subscriber, the first switching system obtains data from the central control and in response thereto routes calls directed to the one subscriber's line directly to the centralized messaging system.

29. A communications system comprising:

a switched communications network for providing selective call connections between subscribers' lines;

a centralized messaging system, wherein the network forwards calls directed to one of said subscribers' lines to said centralized messaging system, and the centralized messaging system includes means for answering forwarded calls and recording incoming messages for individual subscribers; and means for sending an instruction to the network indicating a change in status of storage of messages for the one subscriber in the centralized messaging system, wherein the network changes a parameter of its call forwarding function with respect to calls directed to the one subscriber in response to said instruction, the change in the parameter of the call forwarding function being perceptible to subsequent callers.

30. A system as in claim 29, wherein the network comprises an end office switching system for providing the forwarding of calls directed to the one of said subscribers' lines to said centralized messaging system.

31. A system as in claim 29, wherein the network comprises:

a first switching system and a second switching system for providing the selective call connections between subscribers' lines; and a central control separate from the first and second switching systems, said central control sending data to and receiving data from the first and second switching systems to control said first and second switching systems.

32. A system as in claim 29, wherein said centralized messaging system comprises:

a plurality of processing units for receiving and storing messages from callers and transmitting stored messages to subscribers; and means for selectively routing a plurality of calls forwarded by the network to individual ones of the processing units.

33. In a switched communications network for providing selective call connections between subscribers' lines and between subscribers' lines and a centralized messaging system, a method comprising:

routing a plurality of calls, which are directed to one subscriber's line and which are not answered after a predetermined period, through the communication network to the centralized messaging system;

wherein for each one of said plurality of calls, the predetermined period will have either a first value or a second value depending on a current status at the time of the call of a service provided by the centralized messaging system to the one subscriber, said first value being higher than said second value.

34. A method as in claim 33, wherein said status relates to whether or not the centralized messaging system stores at least one message for the one subscriber.

35. A method as in claim 33, further comprising receiving input information from the one subscriber defining the first value and the second value.

36. In a switched communications network having at least one switching system for providing selective communications between subscribers' lines, and at least one centralized messaging system for storing messages directed to individual subscribers, said at least one switching system also providing selective communications between subscribers' lines and the centralized messaging system, a method comprising:

receiving in the centralized messaging system information from a subscriber defining a predetermined ringing interval;

transmitting information representing the received information from the centralized messaging system to the communications network;

forwarding at least one call directed to a line assigned to the subscriber to the centralized messaging system if the call is not answered on the subscriber's line within the predetermined ringing interval;

wherein the received information includes a first value and a second value for said predetermined ringing interval, said first value being higher than said second value, and the step of forwarding at least one call comprises forwarding a first call if unanswered within an interval equal to the first value and forwarding a second call if unanswered within an interval equal to the second value.

37. A switched communications network comprising:

a switching system providing selective call connections between subscribers' lines;

a centralized messaging system for storing messages directed to individual subscribers and transmitting stored messages to subscribers, wherein said switching system forwards calls directed to one of said subscribers' lines to said centralized messaging system; and means for sending an instruction to the switching system in response to a change in status of a service provided by the centralized messaging system to the one subscriber, wherein said switching system changes a parameter of its call forwarding function with respect to calls directed to the one subscriber in response to said instruction.

38. A system as in claim 37, wherein said change of status relates to whether or not the centralized messaging system stores any messages for said one subscriber.

39. A system as in claim 38, wherein the status changes once when said centralized messaging system stores a new message for said one subscriber and the status changes again when said centralized messaging system transmits the new message to said one subscriber.

40. A system as in claim 37, wherein the centralized messaging system is a mail system and the service provided by said centralized messaging system is storage of messages in a mailbox assigned to the one subscriber.

41. A system as in claim 40, wherein the centralized messaging system is a voice mail system for storing and retrieving audio messages.

42. A system as in claim 37, wherein the centralized messaging system changes the status of said service in response to information input by the one subscriber.

43. A system as in claim 42, wherein the centralized messaging system receives service activation information from the one subscriber.

44. A system as in claim 42, wherein the information input by the one subscriber specifies a call forwarding parameter.

45. A system as in claim 44, wherein the specified call forwarding parameter determines a ringing threshold interval after which a call is recognized as unanswered.

* * * * *